(12) United States Patent
Brettschneider et al.

(10) Patent No.: US 7,749,307 B2
(45) Date of Patent: Jul. 6, 2010

(54) REGENERATIVE ADSORPTION PROCESSES FOR REMOVING ORGANIC COMPONENTS FROM GAS STREAMS

(75) Inventors: Ole Brettschneider, Berlin (DE); Knud Werner, Krefeld (DE); Torsten Erwe, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 260 days.

(21) Appl. No.: 12/100,456

(22) Filed: Apr. 10, 2008

(65) Prior Publication Data

US 2008/0250924 A1 Oct. 16, 2008

(30) Foreign Application Priority Data

Apr. 10, 2007 (DE) .................. 10 2007 016 973

(51) Int. Cl.
*B01D 53/02* (2006.01)
*B01J 20/34* (2006.01)

(52) U.S. Cl. .................. 95/142; 95/143; 95/148; 62/617

(58) Field of Classification Search .......... 95/141–148; 62/600, 606, 617; 423/210, 245.1; 203/41
See application file for complete search history.

(56) References Cited

U.S. PATENT DOCUMENTS

| | | | |
|---|---|---|---|
| 4,774,070 A | | 9/1988 | Itoh et al. |
| 4,846,852 A | * | 7/1989 | Schweitzer et al. ........... 95/125 |
| 5,137,548 A | * | 8/1992 | Grenier et al. ................. 95/41 |
| 5,345,771 A | * | 9/1994 | Dinsmore .................... 62/641 |
| 5,611,840 A | * | 3/1997 | Kraus et al. ................... 95/41 |
| 6,793,905 B1 | * | 9/2004 | Buttner et al. .............. 423/488 |
| 7,294,173 B2 | * | 11/2007 | Masetto et al. ................. 95/148 |
| 2006/0123842 A1 | * | 6/2006 | Sohn et al. .................... 62/617 |
| 2007/0261437 A1 | * | 11/2007 | Boonstra et al. .............. 62/617 |
| 2007/0277551 A1 | * | 12/2007 | Kamper ....................... 62/617 |
| 2008/0295688 A1 | * | 12/2008 | Sesing et al. ................... 95/93 |

FOREIGN PATENT DOCUMENTS

| | | |
|---|---|---|
| CA | 2186884 | 8/1996 |
| DE | 19503052 | 8/1996 |
| EP | 0233773 | 8/1987 |
| EP | 1275429 | 1/2003 |
| EP | 1801089 | 6/2007 |
| EP | 1894885 | 3/2008 |
| WO | WO-2006/038705 | 4/2006 |
| WO | WO-2006/137583 | 12/2006 |

\* cited by examiner

*Primary Examiner*—Frank M Lawrence
(74) *Attorney, Agent, or Firm*—Connolly Bove Lodge & Hutz LLP

(57) ABSTRACT

Process for providing a purified gas stream, comprising: providing a crude gas stream comprising an organic impurity; condensing at least a portion of the impurity from the gas stream to form a prepurified gas stream; and subjecting the prepurified stream to adsorption on a first adsorption medium; wherein the first medium is subjected to a regeneration comprising: providing a circulating inert gas stream having a temperature of at least 100° C.; passing the circulating inert gas stream over the first medium to form an organic impurity-loaded inert gas stream; cooling the loaded stream; condensing at least a portion of the organic impurity from the cooled stream to provide a prepurified circulating inert gas stream; subjecting the prepurified gas stream to adsorption on a second adsorption medium to provide a purified circulating inert gas stream; and recycling the purified gas stream to the circulating inert gas stream.

26 Claims, 2 Drawing Sheets

REGENERATIVE ADSORPTION PROCESSES FOR REMOVING ORGANIC COMPONENTS FROM GAS STREAMS

BACKGROUND OF THE INVENTION

A process for the catalytic oxidation of HCl gas is described in European Patent No. EP 233 773 B1, in which a HCl gas contaminated with organic impurities such as benzene, chlorobenzene and the like is prepurified for use in a Deacon process (catalytic HCl oxidation by means of oxygen). In the prepurification described therein, activated carbon is used as the adsorber and is regenerated after use. It is further proposed to regenerate the adsorber at elevated temperatures or under reduced pressure and optionally using an inert gas.

One disadvantage of such a process is that the production process and the HCl purification process must be interrupted for regeneration of the activated carbon bed. A further disadvantage of such a process is that the regeneration is conducted thermally or at reduced pressure, which is disadvantageous in terms of energy, or is carried out using an inert gas, which is expensive.

Adsorptive separation to remove contaminants from gas streams, particularly organic contaminants, is frequently used in chemical processing.

As adsorbents are used, they periodically require regeneration. During regeneration of an adsorbent, the adsorbent is conventionally heated and brought into contact with a regenerating gas stream. The adsorbed components thereby dissolve in the regenerating gas stream and the adsorbent is unloaded.

The achievable pity of the gas stream from which the contaminants are to be removed can depend greatly on the regeneration of the loaded adsorbent.

Conventional regeneration processes generally use heated inert gas or steam in order to introduce the required heat energy and the required regenerating gas stream into the system simultaneously. Steam can only be used in cases where moisture can be tolerated within the process. In the case of the working up of crude hydrogen chloride gas, attempts are made to avoid introducing water in order to prevent corrosion of apparatus that comes into contact with the product.

When inert gases (e.g. nitrogen, etc.) are used in regeneration, however, the amounts of gas that must be used to provide a continuous stream of fresh regenerative gas give rise to high costs. If, on the other hand, a circulatory regeneration system with inert gases is used, then components dissolved in the inert gases during regeneration of the adsorber must be depleted before recycling the inert gases to the circulatory system. Otherwise, the regeneration achieved would not be sufficient to provide the required process gas purities during the adsorption operation.

BRIEF SUMMARY OF THE INVENTION

The present invention relates, in general, to processes for working up gas streams, which are contaminated with one or more organic compounds, through adsorption, with regeneration of the adsorption medium. Various preferred embodiments of processes according to the present invention relate to the purification of process gases containing hydrogen chloride.

Various embodiments of the present invention can provide processes which are more advantageous in terms of energy and which, in particular, reduce the use of expensive inert gases during the regeneration of the adsorbers and permit a continuous process.

Various embodiments of the processes according to the present invention can provide reduced inert gas consumption in regenerative adsorption processes for process gas purification of gas streams contaminated with organic compounds.

One embodiment of the present invention includes processes which comprise:

providing a crude gas stream having a temperature not exceeding 40° C., the crude gas stream comprising at least one organic impurity;

condensing at least a portion of the at least one organic impurity from the crude gas stream at a temperature not exceeding 0° C. to form a prepurified gas stream; and subjecting at least a portion, preferably substantially all, and more preferably the entirety, of the prepurified gas stream to adsorption on a first adsorption medium to provide a purified gas stream;

wherein the first adsorption medium is subjected to a regeneration comprising: (i) providing a circulating inert gas stream having a temperature of at least 100° C.; (ii) passing the circulating inert gas stream over the first adsorption medium to form an organic impurity-loaded inert gas stream; (iii) cooling the loaded inert gas stream to a temperature not exceeding 40° C.; (iv) condensing at least a portion of the organic impurity from the cooled, loaded inert gas stream to provide a prepurified circulating inert gas stream; subjecting at least a portion, preferably substantially all, and more preferably the entirety, of the prepurified circulating inert gas stream to adsorption on a second adsorption medium to provide a purified circulating inert gas stream; and recycling the purified circulating inert gas stream to the circulating inert gas stream. In various preferred embodiments, a portion of the purified circulating inert gas stream can be purged and a remainder of the purified circulating inert gas stream is then recycled to form the circulating inert gas stream.

Another embodiment of the present invention includes processes for removing organic components from a crude gas stream, which may optionally be hot, comprising:

A) adjustment of the crude gas stream that is to be purified to a temperature not exceeding 40° C.;

B) condensation of at least some of the organic components of the crude gas stream at a temperature not exceeding 0° C.;

C) subsequent, at least partial adsorption of the residual organic components that remain in the prepurified gas stream after the condensation, on a first adsorption medium;

D) subsequent heat exchange between the purified gas stream leaving the adsorption C) and the crude gas stream entering the process;

E) provision of the purified gas stream; characterized in that the adsorption medium mentioned under C) is subjected to a regeneration comprising the following steps:

F) connection of the adsorption medium to an inert gas circuit;

G) mixing a fresh inert gas stream and a purified recycled inert gas stream to provide a circulating inert gas stream and heating it to a temperature of at least 100° C., in particular in a heater;

H) subsequent passing of the heated circulating inert gas stream over the adsorption medium that is to be regenerated;

I) subsequent cooling of the circulating inert gas stream loaded with the organic components to a temperature not exceeding 40° C.;

J) subsequent condensation of at least some of the organic components of the circulating inert gas stream at a temperature not exceeding 0° C.;

K) subsequent adsorption of the residual organic components that remain in the circulating inert gas stream after the condensation J), in a second adsorption medium;

L) optional subsequent heat exchange between the thus purified circulating inert gas stream leaving the adsorption K) and the circulating inert gas stream entering the condensation J);

M) optional subsequent increase of the pressure of the purified circulating inert gas stream, in particular with the aid of a circulating gas compressor, in order to overcome any circulating gas pressure losses;

N) purge of a portion of the purified circulating inert gas stream and recycling a remainder of the purified circulating inert gas stream to the heater stage G).

BRIEF DESCRIPTION OF THE SEVERAL VIEWS OF THE DRAWING

The foregoing summary, as well as the following detailed description of the invention, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.

In the drawings.

DETAILED DESCRIPTION OF THE INVENTION

Figure 1:
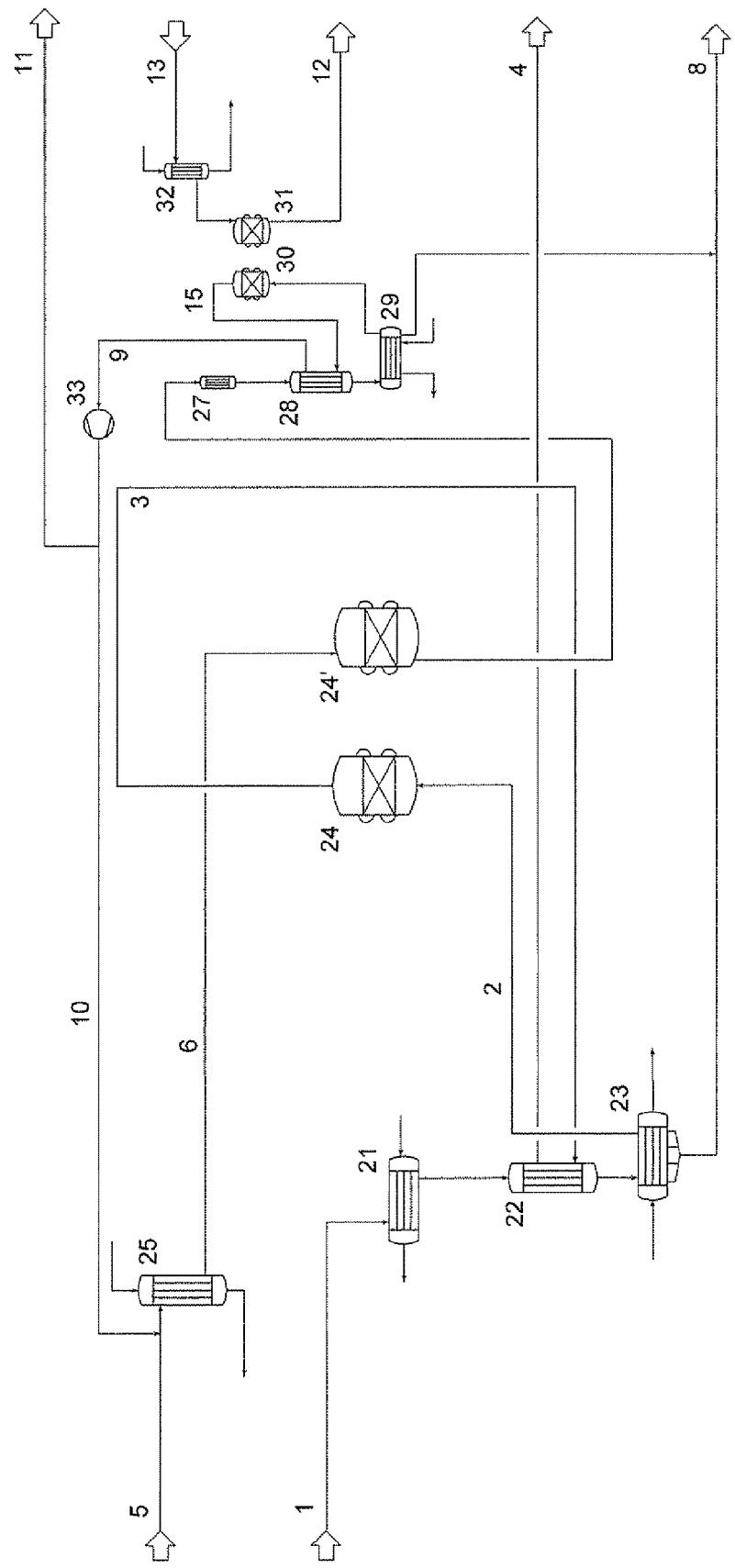
FIG. 1 is a flow diagram of a process in accordance with one embodiment of the present invention.

As used herein, the singular terms "a" and "the" are synonymous and used interchangeably with "one or more" and "at least one," unless the language and/or context clearly indicates otherwise. Accordingly, for example, reference to "a gas stream" herein or in the appended claims can refer to a single gas stream or more than one gas stream. Additionally, all numerical values, unless otherwise specifically noted, are understood to be modified by the word "about."

Suitable adsorption agents which can be used in an adsorption in accordance with the various embodiments of processes according to the present invention include, but are not limited to, activated carbon, zeolites, aluminum oxide, bentonite, silica gel and/or organometallic complexes. Activated carbon is preferred. Suitable types of apparatus for the production of an intensive gas-adsorbent contact are simple fixed beds, fluid beds, fluidized beds, or fixed beds movable as a whole.

Advantages of the adsorptive removal of components from gas streams include very high purities of the purified gas stream that can be achieved, and that, in the case of regenerative adsorption processes, it is possible to recover the organic components for targeted disposal or for returning to preceding preparation processes.

Various embodiments of processes according to the present invention can include providing an initial crude gas stream having a temperature exceeding 40° C. and cooling the initial crude gas stream to provide the crude gas stream having a temperature not exceeding 40° C. The temperature of an initial crude gas stream can be, in particular, up to 400° C., preferably up to 250° C., particularly preferably up to 150° C.

Preference is given to various processes which are characterized by the cooling of an initial crude gas stream, first in a cooler to a temperature not exceeding 45° C. Also preferably, cooling of an initial crude gas stream can take place in a second step, in particular in a recuperator, to a temperature not exceeding 40° C. In various particularly preferred embodiments of the processes according to the invention, heat exchange between the gas stream leaving the adsorption and the crude gas stream entering the process can take place in a recuperator. Cooling preferably takes place in a first step in a cooler to a temperature not exceeding 45° C. and in a second step in a recuperator to a temperature not exceeding 40° C.

In various preferred embodiments of the processes according to the invention, the second adsorption medium can be regenerated with the aid of another heated inert gas stream.

The process is particularly preferably used when the crude gas stream that is to be purified consists essentially of hydrogen chloride and/or the inert gas for the circulating inert gas stream consists essentially of nitrogen. As used herein, "Consists essentially of" with respect to hydrogen chloride content in the crude gas stream refers to a hydrogen chloride content of at least 80% by weight, more preferably at least 90% by weight, and most preferably at least 95% by weight. As used herein, "consists essentially of" with respect to nitrogen content in the circulating inert gas stream refers to a nitrogen content of at least 70% by weight, more preferably at least 80% by weight, and most preferably at least 90% by weight.

Organic components that can be separated from a crude gas stream in accordance with the various embodiments of the processes according to the present invention preferably include hydrocarbons and/or halogenated hydrocarbons, particularly preferably aromatic hydrocarbons such as benzene, toluene, xylenes and $C_6$-$C_{12}$-aliphatic compounds, and/or chlorinated hydrocarbons such as carbon tetrachloride, vinyl chloride and dichloroethane, and/or chlorinated aromatic hydrocarbons such as hexachlorobenzene, chlorobenzene and/or orthodichlorobenzene.

In various particularly preferred embodiments of the processes according to the invention, the adsorption can take place in at least two adsorption stages. Particularly preferably, the first adsorption medium of the first stage is regenerated with the aid of a partial stream of the crude gas stream, and the loaded crude gas partial stream is optionally combined with the crude gas stream entering the condensation.

A preferred modification of the processes according to various embodiments of the invention can include regeneration of the adsorption medium of the first stage from time to time by means of an inert gas, optionally in a single pass, alternately with regeneration by means of the crude gas partial stream. In the case of adsorption in two or more stages, inert gas is particularly preferably passed for regeneration starting from the last adsorption stage via the series of adsorbers to the first adsorber.

The processes according to the invention are particularly preferably used when the hydrogen-chloride-containing purified gas stream is used further in a production process for the preparation of chlorine from hydrogen chloride and oxygen, in particular in a catalyzed gas-phase oxidation of hydrogen chloride with oxygen or in a non-thermal reaction of hydrogen chloride and oxygen. Coupling with the catalyzed gas-phase oxidation of hydrogen chloride with oxygen Deacon process) is particularly preferred.

As already described above, the catalytic process known as the Deacon process is preferably used in combination with the processes according to the invention. In a Deacon process, hydrogen chloride is oxidized to chlorine with oxygen in an exothermic equilibrium reaction, with the formation of steam. The reaction temperature is conventionally from 150 to 500° C. and the conventional reaction pressure is from 1 to 25 bar. Because the reaction is an equilibrium reaction, it is advantageous to work at the lowest possible temperatures at which the catalyst still has sufficient activity. It is also advantageous to use oxygen in over-stoichiometric amounts relative to the hydrogen chloride. A two- to four-fold oxygen excess, for example, is conventional. Because there is no risk of losses of selectivity, it can be economically advantageous to work at a relatively high pressure and accordingly with a longer residence time as compared with normal pressure.

Suitable preferred catalysts for the Deacon process comprise ruthenium oxide, ruthenium chloride or other ruthenium compounds on silicon dioxide, aluminum oxide, titanium dioxide or zirconium dioxide as support. Suitable catalysts can be obtained, for example, by applying ruthenium chloride to the support and then drying or drying and calcining. In addition to or instead of a ruthenium compound, suitable catalysts can also comprise compounds of other noble metals, for example gold, palladium, platinum, osmium, iridium, silver, copper or rhenium. Suitable catalysts can farther comprise chromium(III) oxide.

The catalytic hydrogen chloride oxidation can be carried out adiabatically or, preferably, isothermally or approximately isothermally, discontinuously, but preferably continuously as a fluid or fixed bed process, preferably as a fixed bed process, particularly preferably in tubular reactors on heterogeneous catalysts at a reactor temperature of from 180 to 500° C., preferably from 200 to 400° C., particularly preferably from 220 to 350° C., and a pressure of from 1 to 25 bar (from 1000 to 25,000 hPa), preferably from 1.2 to 20 bar, particularly preferably from 1.5 to 17 bar and especially from 2.0 to 15 bar.

Conventional reaction apparatuses in which the catalytic hydrogen chloride oxidation is carried out are fixed bed or fluidized bed reactors. The catalytic hydrogen chloride oxidation can preferably also be carried out in a plurality of stages.

In the case of the adiabatic, isothermal or approximately isothermal procedure, it is also possible to use a plurality of reactors, that is to say from 2 to 10, preferably from 2 to 6, particularly preferably from 2 to 5, especially 2 or 3 reactors, connected in series with intermediate cooling. The hydrogen chloride can either be added in its entirety, together with the oxygen, upstream of the first reactor, or distributed over the various reactors. This series connection of individual reactors can also be combined in one apparatus.

In a further preferred form of a device suitable for the process there is used a structured bulk catalyst in which the catalytic activity increases in the direction of flow. Such structuring of the bulk catalyst can be effected by variable impregnation of the catalyst support with active substance or by variable dilution of the catalyst with an inert material. As the inert material there can be used, for example, rings, cylinders or spheres of titanium dioxide, zirconium dioxide or mixtures thereof aluminum oxide, steatite, ceramics, glass, graphite, stainless steel or nickel alloys. When catalyst shaped bodies are used, as is preferred, the inert material should preferably have similar outside dimensions.

Suitable catalyst shaped bodies are shaped bodies of any shape, preferred shapes being lozenges, rings, cylinders, stars, cart wheels or spheres and particularly preferred shapes being rings, cylinders or star-shaped extrudates.

Suitable heterogeneous catalysts are in particular ruthenium compounds or copper compounds on support materials, which can also be doped, with preference being given to optionally doped ruthenium catalysts. Examples of suitable support materials are silicon dioxide, graphite, titanium dioxide of rutile or anatase structure, zirconium dioxide, aluminum oxide or mixtures thereof, preferably titanium dioxide, zirconium dioxide, aluminum oxide or mixtures thereof, particularly preferably γ- or δ-aluminum oxide or mixtures thereof.

The copper or ruthenium supported catalysts can be obtained, for example, by impregnating the support material with aqueous solutions of $CuCl_2$ or $RuCl_3$ and optionally of a promoter for doping, preferably in the form of their chlorides. Shaping of the catalyst can take place after or, preferably, before the impregnation of the support material.

Suitable promoters for the doping of the catalysts are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof.

The shaped bodies can then be dried and optionally calcined at a temperature of from 100 to 400° C., preferably from 100 to 300° C., for example, under a nitrogen, argon or air atmosphere. The shaped bodies are preferably first dried at from 100 to 150° C. and then calcined at from 200 to 400° C.

The hydrogen chloride conversion in a single pass can preferably be limited to from 15 to 90%, preferably from 40 to 85%, particularly preferably from 50 to 70%. After separation, some or all of the unreacted hydrogen chloride can be fed back into the catalytic hydrogen chloride oxidation. The volume ratio of hydrogen chloride to oxygen at the entrance to the reactor is preferably from 1:1 to 20:1, preferably from 1:1 to 8:1, particularly preferably from 1:1 to 5:1.

The heat of reaction of the catalytic hydrogen chloride oxidation can advantageously be used to produce high-pressure steam. This can be used to operate a phosgenation reactor and/or distillation columns, in particular isocyanate distillation columns.

In a further step, the chlorine that has formed is separated off. The separation step conventionally comprises a plurality of stages, namely the separation and optional recycling of unreacted hydrogen chloride from the product gas stream of the hydrogen chloride oxidation, drying of the resulting stream containing substantially chlorine and oxygen, and the separation of chlorine from the dried stream.

The separation of unreacted hydrogen chloride and of steam that has formed can be carried out by removing aqueous hydrochloric acid from the product gas stream of the hydrogen chloride oxidation by cooling. Hydrogen chloride can also be absorbed in dilute hydrochloric acid or water.

The invention will now be described in further detail with reference to the following non-limiting examples.

EXAMPLES

Example 1

Referring to FIG. 1, a process in accordance with an embodiment of the present invention is depicted, which provides high purity of the regenerating gas, and hence a high degree of regeneration of the adsorber, while at the same time, the amount of inert gas consumed is minimal.

As is shown in FIG. 1, the regenerating gas stream is guided in a circuit in the process according to the invention, and the amount of inert gas consumed is thus minimized.

An initial crude gas stream 1 is precooled in a cooler 21 and passed through the recuperator 22 to provide a crude gas stream. In this example, the initial crude gas stream comprised a hydrogen chloride gas from a TDI production. Organic impurities such as chlorobenzene, hexachlorobenzene, and/or orthodichlorobenzene are condensed in the condenser 23 and discharged as stream 8.

The prepurified crude gas 2 is passed over an adsorber bed 24 of activated carbon, and the purified gas stream 3 of hydrogen chloride is passed via the recuperator 22 to undergo heat exchange with incoming initial crude gas 1 and is discharged as product stream 4 which may then be oxidized to chlorine in a Deacon process (not shown).

The loaded adsorber bed 24', which is operated alternately with adsorber bed 24, is purified with an inert gas 6 which is composed of fresh inert gas 5 and a return stream 10 and is heated in the heat exchanger 25.

After passing through the adsorber 24', the loaded regenerating gas stream is cooled down in a precooler 27. Further cooling then takes place in a recuperator 28. The regenerating gas stream is subsequently cooled further in a low-temperature condenser 29. During this cooling, a substantial part of the organic components contained in the circulating regenerating gas is conveyed away and combined with the stream 8. In accordance with the thermodynamic equilibrium, however, a proportion of organic components corresponding to the vapor pressure of the organic components in question will still remain in the gas phase. This proportion can be reduced somewhat by the choice of appropriately low temperatures or high process pressures.

The residual amounts of organic components that remain in the gas stream after the low-temperature condensation 29 are separated off in a subsequent adsorber bed 30. Heat exchange of the purified inert gas 15 with the loaded inert gas leaving the precooler 27 then takes place in the recuperator 28, The purified inert gas stream 9 present downstream of the recuperator 28 is then fed to a circulating gas compressor 33, with the aid of which the pressure losses in the regeneration circuit are overcome.

If the circulating gas adsorber 30 is loaded, it is replaced by the adsorber 31 and switched to regeneration operation. To this end, fresh inert gas 13 is heated in heat exchanger 32 and passed over the adsorber 31 in the opposite direction to the direction of flow during the loading phase. The loaded regenerating gas stream 12 is discharged from the system.

The regenerative adsorption process according to this embodiment of the invention for removing organic components from gas streams accordingly permits reduced inert gas consumption for the regeneration by the provision of a circulating gas procedure for the regenerating gas with at the same time high degrees of regeneration owing to the use of a circulating gas adsorber and the high circulating gas purities achieved thereby. Furthermore, the use of a circulating gas adsorber allows components that are not condensable in the low-temperature condensation to be discharged, and the accumulation thereof in the process is thus reduced or prevented.

The inert gas feed 5 into the regeneration circuit shown in FIG. 1 can serve to maintain the pressure, to flush the system or alternatively to discharge components which otherwise accumulate. Discharge can take place via stream 11. Feed and discharge can, however, optionally also take place at any other positions in the regenerating gas circuit.

Example 2

Figure 2:
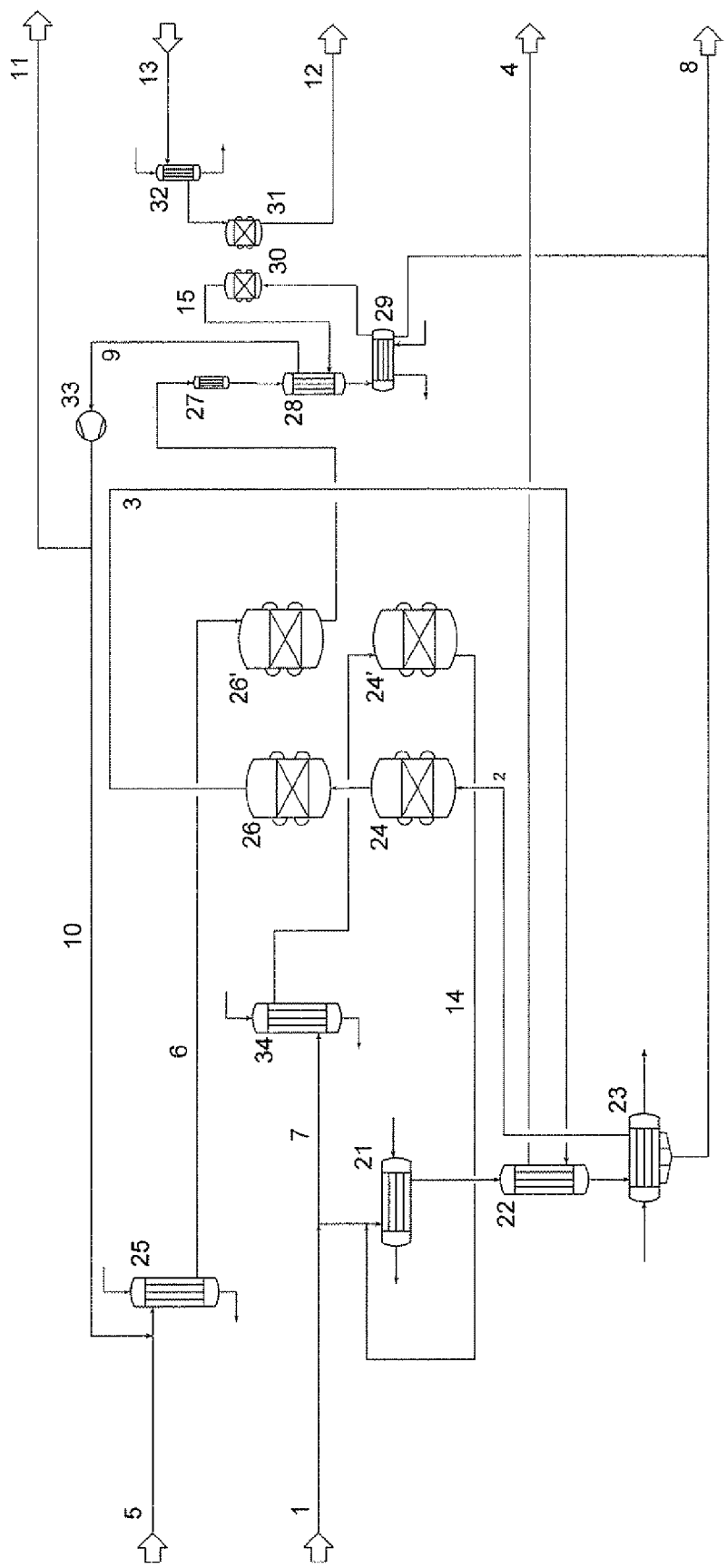
FIG. 2 is a flow diagram of a process in accordance with another embodiment of the present invention.

Referring to FIG. 2, an additional embodiment of a process according to the present invention for making a saving in terms of the inert gas used for the regeneration is depicted and includes using heated process gas for the partial regeneration of the adsorbers. This embodiment employs a two-stage, redundant adsorber unit 24, 26 or 24', 26'.

In adsorption mode, the crude gas 1 here too passes through the cooling and condensation stages 21, 22 and 23 which have already been described above with reference to FIG. 1, and in which some of the organic components contained in the gas stream are removed. The prepurified crude gas 2 from stage 23 is fed to a two-stage adsorption 24, 26, where some or all of the remaining organic components are separated off.

The embodiment depicted in FIG. 2 employs a two-stage adsorption because in regeneration operation the first adsorption stage 24' is only partially regenerated with the heated partial stream 7 of the crude gas, and the required purities in the process gas can only be achieved by a second adsorption stage 26' with an increased degree of regeneration.

The purified gas 3 from adsorber 26 is subjected to heat exchange with the crude gas 1 in recuperator 22. After that it is provided as stream 4 to a Deacon-process (not shown in FIG. 2) where it is oxidized to chlorine.

As is shown in FIG. 2, for regeneration of the first adsorption stage, some of the still untreated crude gas is heated and applied to the first stage 24' of the adsorption. Depending on the temperature and the organic load of the process gas, the first adsorption stage 24' is partially regenerated thereby. Complete regeneration is not achieved because of the preloading of the process gas stream.

The loaded partial stream 14 of process gas used for partial regeneration is then mixed with the crude gas stream 1 again.

Regeneration of the second adsorption stage takes place with inert gas either in a single pass (not shown in FIG. 2) or by recycling (shown in FIG. 2). As already described in example 1, the loaded adsorber 26' (that is operated alternately with adsorber 26) is regenerated with an inert gas 6 that is composed of a fresh inert gas 5 and a recycled stream 10. Streams 5 and 10 are beforehand heated in a heat exchanger 25. After passing adsorber 26' the loaded regenerating gas stream flows through the apparatuses 27, 28 and 29 as already described in example 1. There, a considerable amount of the organic load is separated off, conveyed away and combined with stream 8. In accordance with the thermodynamic equilibrium, however, a proportion of organic components corresponding to the vapor pressure of the organic components in question will still remain in the gas phase. This proportion can be reduced somewhat by the choice of appropriately low temperatures or high process pressures.

The residual amounts of organic components that remain in the gas stream after the low-temperature condensation 29 are separated off in a subsequent adsorber bed 30. Heat exchange of the purified inert gas 15 with the loaded inert gas leaving the precooler 27 then takes place in the recuperator 28. The purified inert gas stream 9 present downstream of the recuperator 28 is then fed to a circulating gas compressor 33 to overcome pressure losses in the regeneration circuit.

If the circulating gas adsorber 30 is loaded, it is replaced by the adsorber 31 and switched to regeneration operation. To this end, fresh inert gas 13 is heated in heat exchanger 32 and passed over the adsorber 31 in the opposite direction to the direction of flow during the loading phase. The loaded regenerating gas stream 12 is discharged from the system.

The inert gas feed 5 into the regeneration circuit shown in FIG. 2 can serve to maintain the pressure, to flush the system or alternatively to discharge components which otherwise accumulate. Discharge can take place via stream 11. Feed and discharge can, however, optionally also take place at any other positions in the regenerating gas circuit It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process comprising:
providing a crude gas stream having a temperature not exceeding 40° C., the crude gas stream comprising at least one organic impurity;
condensing at least a portion of the at least one organic impurity from the crude gas stream at a temperature not exceeding 0° C. to form a prepurified gas stream; and
subjecting the prepurified gas stream to adsorption on a first adsorption medium to provide a purified gas stream; wherein the first adsorption medium is subjected to a regeneration comprising: (i) providing a circulating inert gas stream having a temperature of at least 100° C.; (ii) passing the circulating inert gas stream over the first adsorption medium to form an organic impurity-loaded inert gas stream; (iii) cooling the loaded inert gas stream to a temperature not exceeding 40° C.; (iv) condensing at least a portion of the organic impurity from the cooled, loaded inert gas stream to provide a prepurified circulating inert gas stream; subjecting the prepurified circulating inert gas stream to adsorption on a second adsorption medium to provide a purified circulating inert gas stream; and recycling the purified circulating inert gas stream to the circulating inert gas stream.

2. The process according to claim 1, further comprising exchanging heat between the purified gas stream and the crude gas stream.

3. The process according to claim 2, wherein the heat exchange is carried out in a recuperator.

4. The process according to claim 1, wherein providing the crude gas stream having a temperature not exceeding 40° C. comprises providing an initial crude gas stream having a temperature exceeding 40° C. and cooling the initial crude gas stream to the temperature not exceeding 40° C.

5. The process according to claim 2, wherein providing the crude gas stream having a temperature not exceeding 40° C. comprises providing an initial crude gas stream having a temperature exceeding 40° C. and cooling the initial crude gas stream to the temperature not exceeding 40° C.

6. The process according to claim 4, wherein cooling the initial crude gas stream to the temperature not exceeding 40° C. comprises a first temperature adjustment carried out in a cooler to a temperature not exceeding 45° C. and a second temperature adjustment carried out in a recuperator to the temperature not exceeding 40° C.

7. The process according to claim 1, wherein cooling the loaded inert gas stream to the temperature not exceeding 40° C. comprises a first temperature adjustment carried out in a cooler to a temperature not exceeding 45° C. and a second temperature adjustment carried out in a recuperator to the temperature not exceeding 40° C.

8. The process according to claim 2, wherein cooling the loaded inert gas stream to the temperature not exceeding 40° C. comprises a first temperature adjustment carried out in a cooler to a temperature not exceeding 45° C. and a second temperature adjustment carried out in a recuperator to the temperature not exceeding 40° C.

9. The process according to claim 1, further comprising subjecting the second adsorption medium to a regeneration with an inert gas.

10. The process according to claim 1, wherein the crude gas stream further comprises hydrogen chloride.

11. The process according to claim 1, wherein the circulating inert gas stream comprises nitrogen.

12. The process according to claim 2, further comprising subjecting the second adsorption medium to a regeneration with an inert gas.

13. The process according to claim 2, wherein the crude gas stream further comprises hydrogen chloride.

14. The process according to claim 2, wherein the circulating inert gas stream comprises nitrogen.

15. The process according to claim 10, wherein the circulating inert gas stream comprises nitrogen.

16. The process according to claim 1, wherein the at least one organic impurity comprises a component selected from the group consisting of hydrocarbons, halogenated hydrocarbons and mixtures thereof.

17. The process according to claim 1, wherein the at least one organic impurity comprises a component selected from the group consisting of benzene, toluene, xylenes, $C_6$-$C_{12}$-aliphatic compounds, carbon tetrachloride, vinyl chloride, dichloroethane, hexachlorobenzene, chlorobenzene, orthodichlorobenzene, and mixtures thereof.

18. The process according to claim 1, wherein the adsorption of the prepurified gas stream is carried out in at least two adsorption stages.

19. The process according to claim 2, wherein the at least one organic impurity comprises a component selected from the group consisting of hydrocarbons, halogenated hydrocarbons and mixtures thereof.

20. The process according to claim 2, wherein the at least one organic impurity comprises a component selected from the group consisting of benzene, toluene, xylenes, $C_6$-$C_{12}$-aliphatic compounds, carbon tetrachloride, vinyl chloride, dichloroethane, hexachlorobenzene, chlorohenzene, orthodichlorobenzene, and mixtures thereof.

21. The process according to claim 2, wherein the adsorption of the prepurified gas stream is carried out in at least two adsorption stages.

22. The process according to claim 18, wherein the first adsorption medium in at least one of the at least two stages of the adsorption is subjected to a regeneration comprising: providing a partial stream diverted from the crude gas stream; and passing the partial stream over the first adsorption medium in the at least one stage to form an organic impurity-loaded partial stream.

23. The process according to claim 22, further comprising recycling the loaded partial stream to the crude gas stream prior to condensation.

24. The process according to claim 22, wherein the partial stream diverted from the crude gas stream is substituted from time to time by an inert gas, and wherein the inert gas is optionally passed over the first adsorption medium in a single pass.

25. The process according to claim 1, wherein the crude gas stream further comprises hydrogen chloride, and wherein the purified gas stream is fed to a process for the production of chlorine from hydrogen chloride and oxygen.

26. The process according to claim 2, wherein the crude gas stream further comprises hydrogen chloride, and wherein the purified gas stream is fed to a process for the production of chlorine from hydrogen chloride and oxygen.

* * * * *